United States Patent [19]
Merrill

[11] Patent Number: 6,130,713
[45] Date of Patent: Oct. 10, 2000

[54] CMOS ACTIVE PIXEL CELL WITH SELF RESET FOR IMPROVED DYNAMIC RANGE

[75] Inventor: Richard Billings Merrill, Woodside, Calif.

[73] Assignee: Foveonics, Inc., Cupertino, Calif.

[21] Appl. No.: 08/884,204

[22] Filed: Jun. 27, 1997

[51] Int. Cl.[7] .................................................. H04N 5/335
[52] U.S. Cl. .......................................... 348/308; 348/297
[58] Field of Search ................................... 348/294, 396, 348/297, 300, 301, 302, 308; 250/208.1, 214 A; 257/292; H04N 5/335

[56] References Cited

U.S. PATENT DOCUMENTS

| | | | |
|---|---|---|---|
| 5,933,190 | 8/1999 | Dierickx et al. | 348/302 |
| 6,011,251 | 1/2000 | Dierickx et al. | 348/302 |
| 6,043,470 | 3/2000 | Chiang | 348/308 |
| 6,046,444 | 4/2000 | Afghahi | 348/308 |

*Primary Examiner*—Tuan Ho

[57] ABSTRACT

An image cell having self-reset which provides improved dynamic range is achieved by having a reset circuit, a comparator circuit and a memory circuit. The image cell operates such that the comparator circuit compares the voltage potential of the image cell with a reference voltage potential. Once the comparator circuit senses that the voltage potential of the image cell transcends the reference voltage potential, the comparator circuit sends a reset signal to the reset circuit. The reset circuit then resets the image cell. Each time the image cell is reset, a reset value is stored in the memory circuit, and the sum of the reset values stored in the memory circuit corresponds to the number of times the image cell has been reset. By resetting the image cell a plurality of times, the dynamic range of a conventional image cell can be increased.

20 Claims, 4 Drawing Sheets

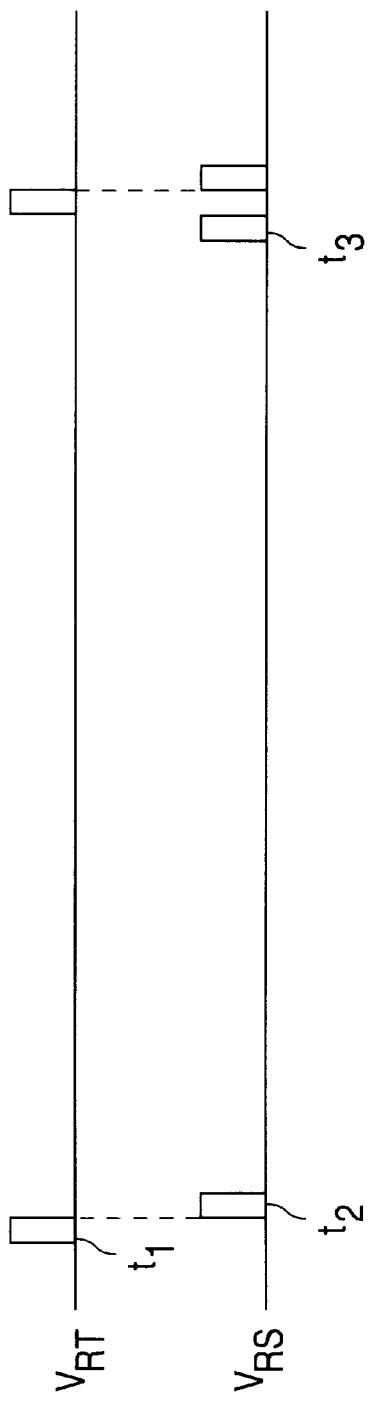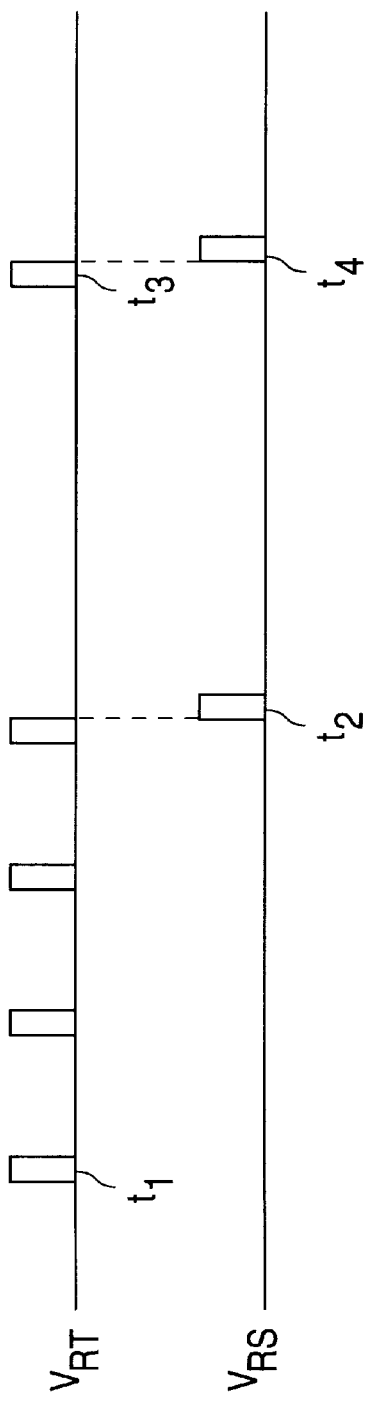

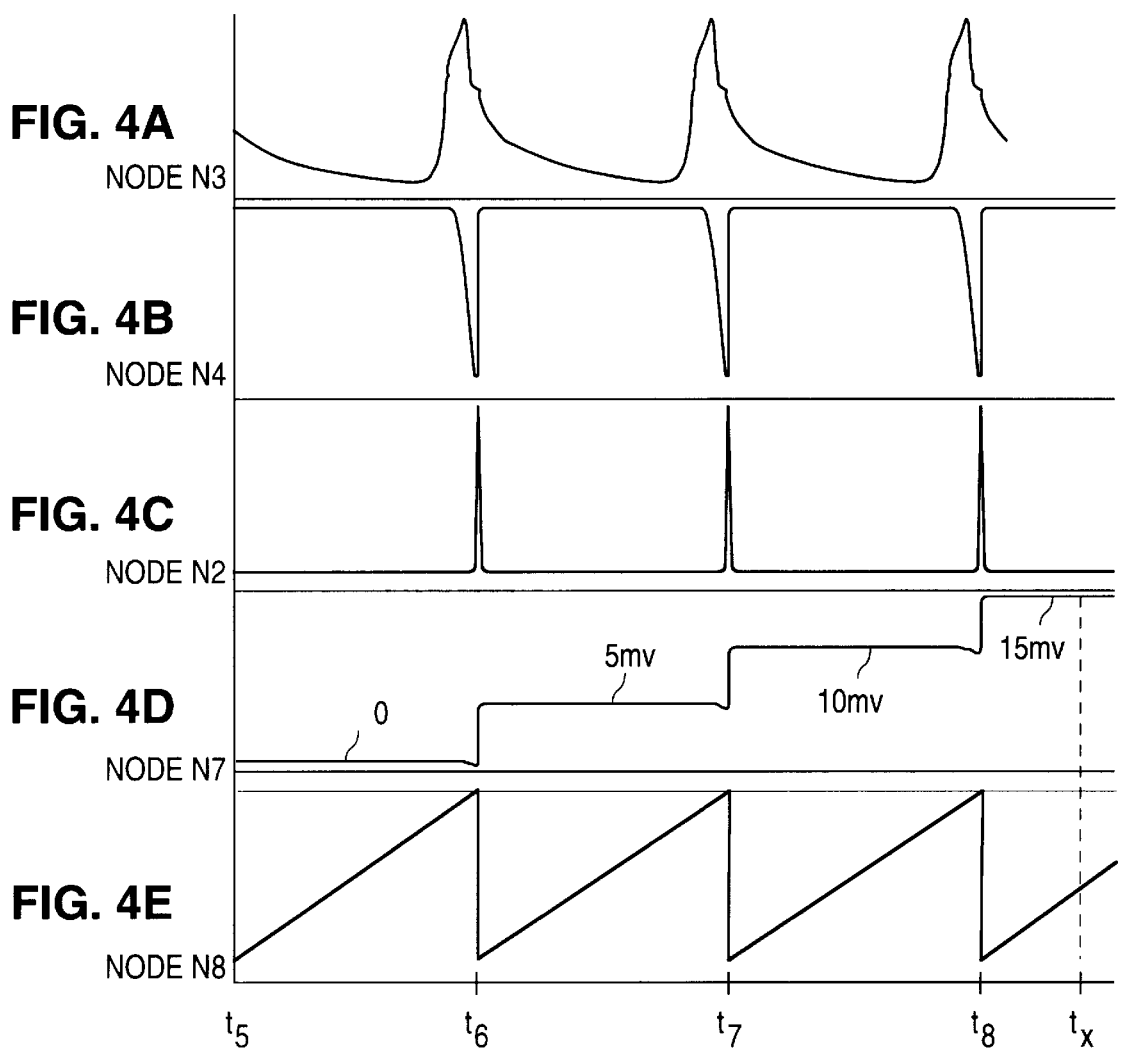
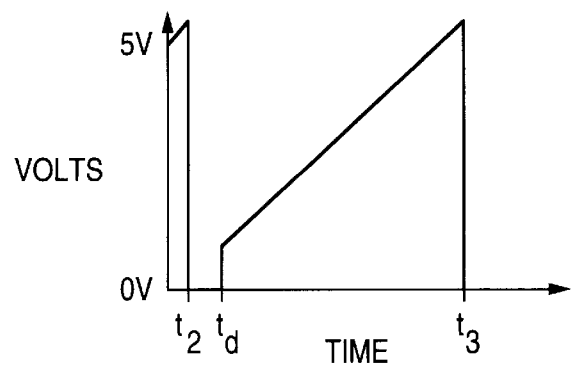
FIG. 5

CM OS ACTIVE PIXEL CELL WITH SELF RESET FOR IMPROVED DYNAMIC RANGE

BACKGROUND OF THE INVENTION

1. Field of the Invention

The present invention relates to active pixel sensor cells and, more particularly, to an active pixel cell with self reset for increased dynamic range.

2. Description of the Related Art.

Charge-coupled devices (CCDs) have been the mainstay of conventional imaging circuits for converting a pixel of light energy into an electrical signal that represents the intensity of the light energy. In general, CCDs utilize a photogate to convert the light energy into an electrical charge, and a series of electrodes to transfer the charge collected at the photogate to an output sense node.

Although CCDs have many strengths, which include a high sensitivity and fill-factor, CCDs also suffer from a number of weaknesses. Most notable among these weaknesses, which include limited readout rates and dynamic range limitations, is the difficulty in integrating CCDs with CMOS-based microprocessors.

To overcome the limitations of CCD-based imaging circuits, more recent imaging circuits use active pixel sensor cells to convert a pixel of light energy into an electrical signal. With active pixel sensor cells, a conventional photodiode is typically combined with a number of active transistors which, in addition to forming an electrical signal, provide amplification, readout control, and reset control.

FIG. 1 shows an example of a conventional CMOS active pixel sensor cell 10. As shown in FIG. 1, cell 10 includes a photodiode 12 connected between a first intermediate node $N_{IM1}$ and ground, and a reset transistor 14 connected between a power supply node $N_{PS}$ and the first intermediate node $N_{IM1}$.

In addition, cell 10 also includes a buffer transistor 16 and a row-select transistor 18. As further shown in FIG. 1, buffer transistor 16 has a drain connected to the power supply node $N_{PS}$, a source connected to a second intermediate node $N_{IM2}$ and a gate connected to first intermediate node $N_{IM1}$, while row-select transistor 18 is connected between the second intermediate node $N_{IM2}$ and an output node $N_O$.

The operation of active pixel sensor cell 10 is performed in three steps: a reset step, where cell 10 is reset from the previous integration cycle; an image integration step, where the light energy is collected and converted into an electrical signal; and a signal readout step, where the signal is read out.

FIGS. 2A–2B show timing diagrams that illustrate the reset, image integration, and readout steps with respect to cell 10. As shown in FIGS. 1 and 2A–2B, the reset step begins by pulsing the gate of reset transistor 14 with a reset voltage $V_{RT}$ at time $t_1$. The reset voltage $V_{RT}$ turns on reset transistor 14 which pulls up the voltage on photodiode 12 and the gate of buffer transistor 16 to an initial integration voltage. The voltage on the source of buffer transistor 16, in turn, is also pulled up to be one threshold voltage drop below the initial integration voltage on the gate of buffer transistor 16 due to the source-follower operation of buffer transistor 16.

Following this, the value of the initial integration voltage (less the threshold voltage drop of buffer transistor 16) is read out by pulsing the gate of row-select transistor 18 with a row-select voltage $V_{RS}$ at time t2. The row-select voltage $V_{RS}$ turns on row-select transistor 18 which causes the voltage on the source of buffer transistor 16 to appear on the source of row-select transistor 18. The voltage on the source of row-select transistor 18 is detected by conventional detection circuitry and then stored as a reset value.

Next, during integration, light energy, in the form of photons, strikes photodiode 12, thereby creating a number of electron-hole pairs. Photodiode 12 is designed to limit recombination between the newly formed electron-hole pairs. As a result, the photogenerated holes are attracted to the ground terminal of photodiode 12, while the photogenerated electrons are attracted to the positive terminal of photodiode 12 where each additional electron reduces the voltage on photodiode 12.

Following the image integration period, the final integration voltage on cell 10 is read out by pulsing the gate of row-select transistor 18 with row-select voltage $V_{RS}$ at time $t_3$. At this point, the final integration voltage on photodiode 12, less the threshold voltage of buffer transistor 16, is present on the drain of row-select transistor 18. As a result, when row-select transistor 18 is turned on, the voltage on the drain of row-select transistor 18 appears on the source of row-select transistor 18 where the voltage is detected and then stored as a read value.

Thus, at the end of the integration period, a collected photon value which represents the number of photons absorbed by photodiode 12 during the image integration period can be determined by subtracting the read value taken at the end of the integration period from the reset value taken at the beginning of the integration period.

One problem with active pixel sensor cell 10, however, is that imaging systems which utilize an array of active pixel sensor cells suffer from a limited dynamic range. Conventionally, the dynamic range is defined by the maximum number of photons that a cell can collect during an integration period without saturating (exceeding the capacity of) the cell, and the minimum number of photons that a cell can collect during the integration period that can be detected over the noise floor.

Typically, the dynamic range of an active pixel cell is expressed in bits. The quality of the representation of a digital image is determined by bits, which correspond to the number of possible levels or shades of gray in the pixel representation. Usually, at least 6 bits or 64 gray levels are needed to represent an image adequately. Higher-quality imaging systems use 8 bits (256 levels) or even as many as 10 bits (1024 levels) per pixel. For example, the dynamic range of film is limited to approximately 8 bits.

The effect of a limited dynamic range is most pronounced in images that contain both bright-light and low-light sources. In these situations, if the integration period of the array is shortened to the point where none of the bright-light information is lost, i.e., where the number of photons collected by the cells exposed to bright light does not exceed the capacity of the cells during the integration period, then most, if not all, of the low-light information in the cells exposed to low light will be lost (resulting in a black image) because the collected photons will not be distinguishable over the noise floor.

On the other hand, if the integration period of the array is increased to capture the low-light information, i.e., where the number of photons collected by the cells exposed to low light is detectable over the noise floor, then a significant portion of the bright-light information will be lost (resulting in a white image) because the number of photons collected by the cells exposed to bright light will far exceed the capacity of these cells.

One approach to solving the problem of dynamic range is to utilize a non-integrating active pixel sensor cell with a non-linear load device, such as a MOSFET-diode in weak inversion, to obtain a logarithmic response. This approach, however, has a number of drawbacks.

First, the noise in a non-integrating cell is much higher than the noise in a conventional integrating cell (such as cell 10 of FIG. 1). In a conventional integrating cell, the effect of random noise events is averaged over the integration period, while the effect of random noise events in a non-integrating cell can produce substantial distortions. Second, the exact non- linear transfer function of this type of device must be carefully calibrated to avoid variations from cell to cell and due to temperature changes.

Another approach to solving the problem of dynamic range, which is used with CCD systems, is to integrate twice: once with a short exposure and once with a long exposure. For the short exposure, the bright-light information is saved while the low-light information is discarded. Similarly, for the long exposure, the low-light information is saved while the bright-light information is discarded.

The information from the two exposures is then combined to form a composite image. The drawback with this approach, however, is that the resulting image is formed by combining image data from two different periods of time.

Thus, to successfully capture both bright-light and low-light sources in the same image, there is a need for an active pixel cell with self-reset for improved dynamic range.

SUMMARY OF THE INVETION

Conventionally, the dynamic range of an image cell in an image system is defined by the maximum number of photons that the image cell can collect during an integration period without saturating (exceeding the capacity of) the image cell, and the minimum number of photons that the image cell can collect during the integration period that can be detected over the noise floor.

The present invention, however, significantly extends the dynamic range of an image cell by adding circuitry to the conventional image cell, which can repeatedly reset the image cell and store the number of times the image cell has been reset. This is achieved in the following manner. During an integration period the voltage level of the image cell is compared with a reference voltage. Once the voltage level of the image cell transcends the reference voltage level, the image cell is reset. After each reset, a reset value is stored in a memory circuit. The sum of the reset values stored in the memory circuit corresponds to the number of times the image cell has been reset.

Additionally, at any particular time during an integration period the image cell can be read to obtain an integration voltage value. In this way, the memory circuit can be read to obtain a sum of the stored reset values and the image cell can be read to obtain an integration value, the sum of both of which can be used to reconstruct an electrical signal received by the image cell.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

FIGS. 2A–2B are timing diagrams illustrating the reset, image integration, and readout steps with respect to the cell of FIG. 1.

FIGS. 4A–4E are signal diagrams illustrating a simulation of the operation of the image cell of FIG. 3.

FIG. 5 is a signal diagram illustrating the operation the of image cell of FIG. 3.

FIG. 6A–6B are timing diagrams illustrating the operation of the image cell of FIG. 3.

DETAILED DESCRIPTION OF THE PREFERRED EMBODIMENT

Figure 1:
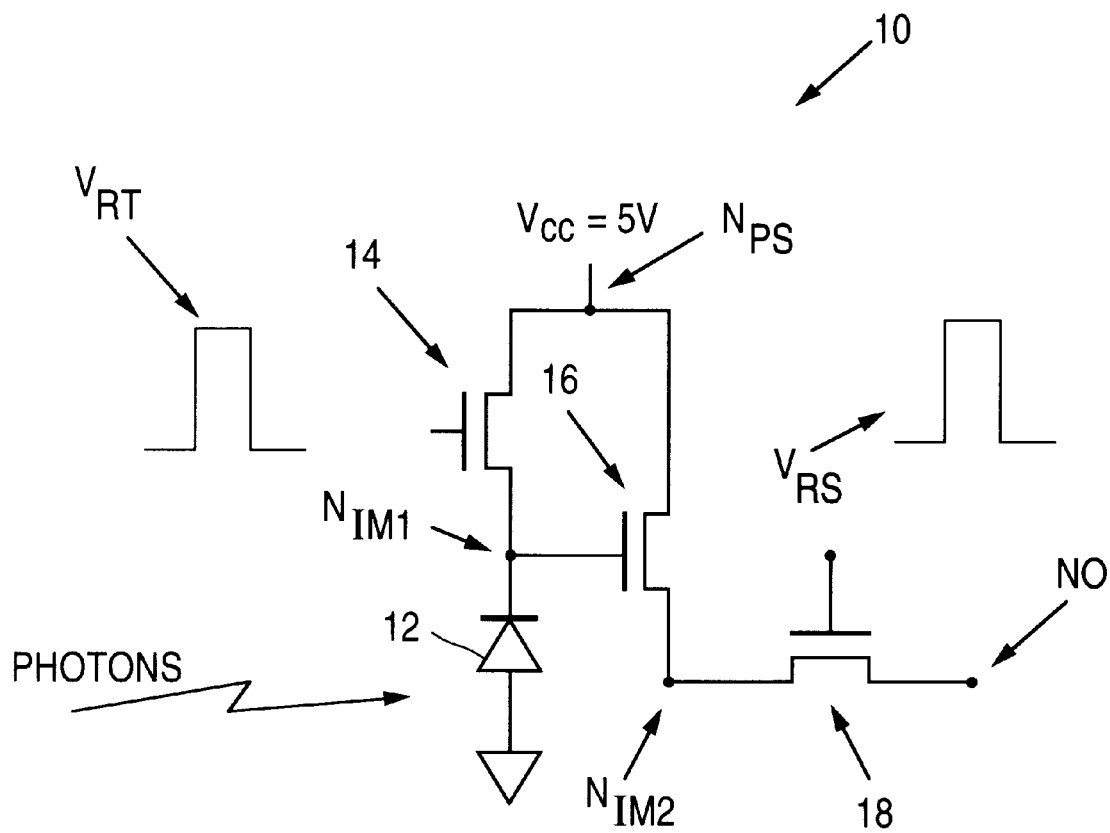
FIG. 1 is a schematic diagram illustrating a conventional active pixel sensor cell.
Figure 3:
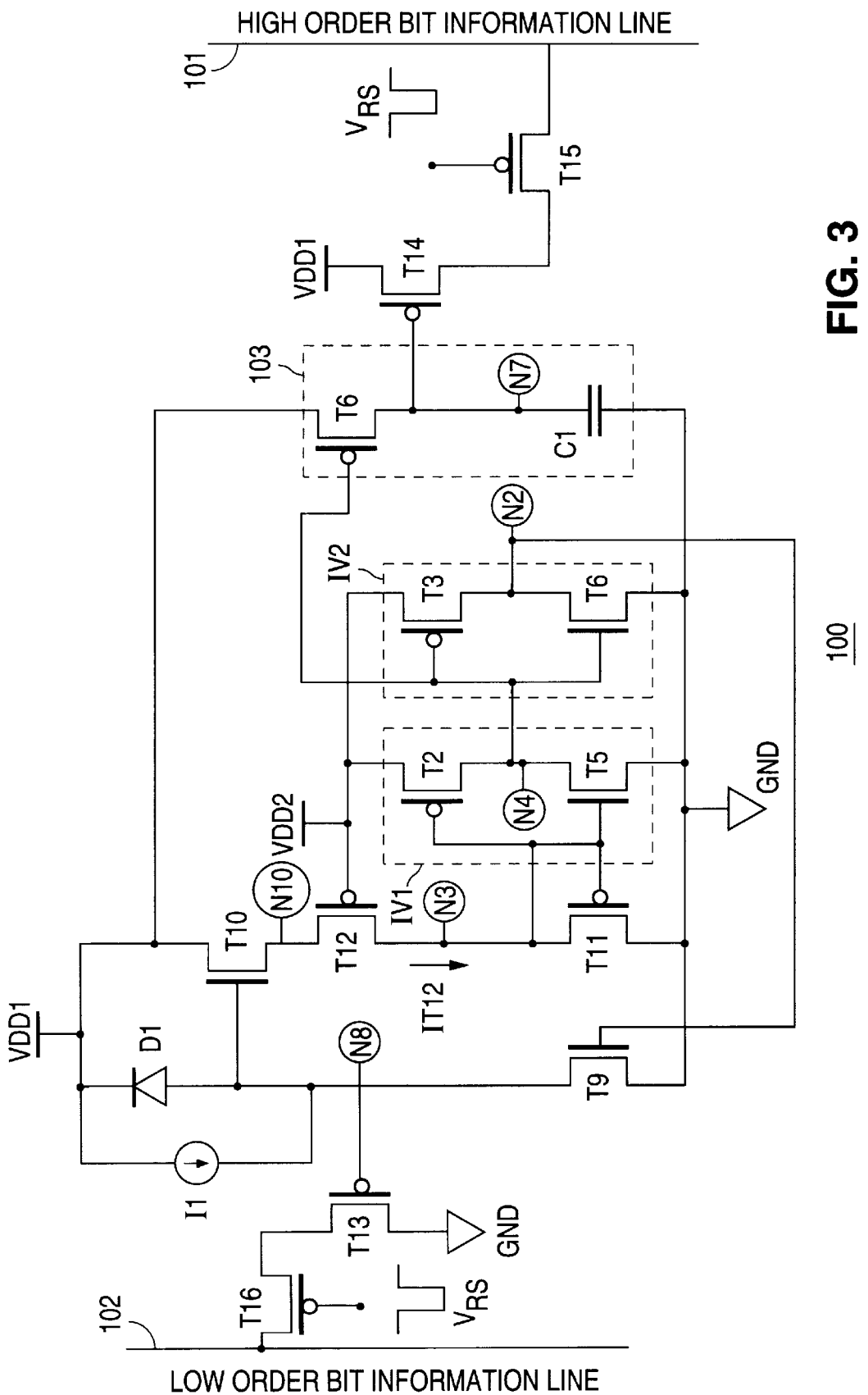
FIG. 3 is a schematic drawing illustrating a single-image cell in accordance with an embodiment of the present invention.

FIG. 3 shows a schematic drawing of a single-cell image system 100 in accordance with the present invention. As shown in FIG. 3, the image cell 100 includes a photodiode D1; a reset transistor T9; a level shifter between voltage supply VDD1 and reference voltage supply VDD2, formed by transistors T10–T12; a first inverter circuit IV1; a second inverter circuit IV2; an analog memory circuit 103 formed by transistor T6 and capacitor C1; and source follower transistors T13, T14 and select transistors T16, T15 which provide information to the high and low order bit information lines 101, 102.

FIGS. 6A–6B show timing diagrams that illustrate the operation of image cell 100 in accordance with the method of the present invention. As shown in FIGS. 6A–6B, the method of the present invention begins as described above with respect to FIGS. 2A–2B with the application of a reset voltage $V_{RT}$ from node N2 to the gate of reset transistor T9 at time $t_1$. After several reset voltages $V_{RT}$ have been applied to reset transistor T9, a row-select voltage $V_{RS}$ is applied to the gate of row-select transistors T16 and T15 at time $t_2$, to detect the voltages at node N8 and N7, respectively, which correspond to low order and high order bits respectively.

Thus, as with FIGS. 2A–2B, image cell 100 is first reset and then read to obtain a reset value that represents the initial integration voltage on photodiode D1 less the threshold voltage drop of buffer transistor T13. Although photodiode D1 is a p+/n– well diode, it will be appreciated that the circuitry in image cell 100 can operate with a n+/p– photodiode.

Next, in accordance with the present invention, once image cell 100 has been read to obtain the initial reset value at time $t_2$, the integration voltage on photodiode D1 increases with time during the integration period, as shown in FIG. 5. When the circuitry in image cell 100 senses that the integration voltage is approaching the saturation level of the image cell 100, the reset transistor T9 resets the image cell 100 at time $t_3$ to begin a second integration period (discussed in more detail below). After the image cell 100 has been reset a second time, at any time $t_4$ during this second integration period the row select voltage $V_{RS}$ can be applied to determine a second reset value. In one embodiment of the present invention, the image cell 100 determines when the integration voltage of image cell 100 is approaching the saturation level by comparing the integration voltage with a reference voltage. Once the integration voltage transcends the reference voltage, transistor T9 resets the image cell 100. Additionally, since the image cell 100 can be reset many times, the memory circuit 103 stores the number of times the image cell 100 has been reset. At a particular time during an integration period, which begins at time $t_2$ and ends at time $t_3$, memory circuit 103 can be read to obtain a stored voltage value indicating the number of times the image cell 100 has been reset. Also, at this particular time, the image cell 100 can be read to obtain a current integration voltage value (at node N8). The current integration voltage value can then be summed with the stored voltage value to reconstruct the electrical signal converted from light energy by image cell 100.

The length of the integration period is defined in video applications by the scan rate to be approximately 30 ms, while the length of the integration period in still photography applications is defined by the lowest or the highest light level to be captured. Longer integration periods allow more photons from faint light sources to be collected which, in turn, allows more of these collected photons to exceed the noise floor.

FIG. 5 illustrates a typical integration period for photodiode D1, beginning at time $t_2$ and ending at time $t_3$. The lower voltage levels, closer to zero (0) volts, correspond to brighter signals since only a short time has passed in which to capture photons. On the other hand, the higher voltage levels, closer to a maximum voltage level of five (5) volts, correspond to brighter signals since a longer time has passed in which to capture photons.

Referring again to FIG. 3, the circuit configuration of the image cell 100 is shown. Photodiode D1 couples between voltage supply VDD1 and node N8, while reset transistor T9, couples between node N8 and circuit ground GND. Photodiode D1 operates in reverse bias, where very little current normally flows. As light enters the photodiode D1, photocurrent having a magnitude proportional to the light intensity, flows across the pn junction. As a result, the voltage across photodiode D1 decreases as more light enters the photodiode D1. Current source I1 represents the leakage current caused by the photocurrent.

The circuitry of image cell 100 monitors the change in voltage across the photodiode D1 during an integration period by monitoring the voltage at node N8. When the image cell 100 senses that the voltage at node N8 is nearing voltage supply VDD1, where information will be lost due to saturation, the reset transistor T9 resets the photodiode D1. Once reset, the photodiode D1 returns to operation in the linear region where information can be captured. After being reset once, the dynamic range of the image cell 100 is doubled because the photodiode D1 can now increase from zero (0) to five (5) volts, not only once, but twice. The photodiode D1 can be repeatedly reset to increase the dynamic range of image cell 100. Since the reset transistor T9 can reset the photodiode D1 many times, the image cell 100 stores the number of times the photodiode D1 is reset. At any time during this integration period, the voltage at node N8, indicating the voltage on photodiode D1, can be read out and stored as a low order bit. Then, when the voltage reaches a threshold level, such as right below the saturation level, then the reset transistor T9 is triggered on to reset the photodiode D1. This voltage reset value is read out and stored as a high order bit.

Typically, a high-quality image system uses eight (8) bits, meaning the linear response of the photodiode D1 can be divided into 256 levels or shades of gray. When the photodiode D1 is reset two hundred fifty six (256) times, then eight (8) more bits are added to the dynamic range of the system. When these eight (8) bits are added to the eight (8) bits obtained from the linear region, the result is a 16 bit system, which provides a much larger dynamic range than is available with conventional pixel cells.

To begin operation of the circuitry in cell 100, photodiode D1 is set to a reverse bias condition and reset transistor T9 is off so that node N8 floats. When reset voltage $V_{RT}$ turns on reset transistor T9, it pulls the voltage on the anode of photodiode D1 and on the gate of transistor T10 down to an initial integration voltage equal to circuit ground GND. As light energy strikes the photodiode D1, the voltage at node N8 increases proportionally to the increase in photocurrent generated by photodiode D1. As this voltage at node N8 increases, the voltage drop across photodiode D1 decreases. Eventually, the image cell 100 collects the maximum amount of charge possible during an integration period without saturating (exceeding the capacity of) the image cell 100. At this point, the image cell 100 resets.

Transistors T10, T12, and T11 form a level shifter between voltage supply VDD1 and reference voltage supply VDD2. Transistor T10 functions as a source follower, so the voltage at node N10 is equal to the voltage at node N8 less the threshold voltage of the transistor. Therefore, the voltage on the source of transistor T10 is pulled down to be one threshold voltage drop below the initial integration voltage on its gate.

Transistor T12 functions as a comparator, comparing the voltage on the source of transistor T10 with reference voltage supply VDD2, which provides a reference voltage smaller than the voltage supply VDD1. As the voltage at node N8 rises towards voltage supply VDD1, the voltage at node N10 also rises towards voltage supply VDD1, although it is more negative than the voltage at node N8 by one threshold voltage. Once the voltage on the source of transistor T10 becomes more positive than the reference voltage supply VDD2 by more than one threshold voltage, transistor T12 turns on to initiate a reset operation.

Consider the following example in conjunction with FIGS. 3 and 4A–4E. Voltage supply VDD1 is 5 Volts and reference supply voltage VDD2 is 1.5 Volts. Once the voltage at node N10 increases to approximately 2.5 volts, the corresponding voltage at node N8 is approximately 3.5 volts when the threshold voltage of transistor T10 is approximately 1.0 volt. Thus, the voltage at node N8 is getting close to the 5 volt capacity of the image cell 100, after which the image cell 100 saturates and results in a loss of information. Therefore, transistor T12 turns on to indicate that the image cell 100 is getting too full, and to initiate a reset operation.

Transistor T12 turning on causes current IT12 to flow. FIG. 4A illustrates the increase in voltage at node N3 until time $t_2$, when the voltage is sufficient to turn on transistor T11 and the first inverter circuit IV1, formed by PMOS transistor T2 and NMOS transistor T5. The first inverter circuit IV1 outputs a low voltage signal at node N4, as seen in FIG. 4B. In turn, the second inverter circuit IV2, formed by PMOS transistor T3 and NMOS transistor T6, outputs a high voltage signal at node N2, as seen in FIG. 4C. This high voltage signal is the reset voltage $V_{RT}$ which turns on the reset transistor T9. Then, once transistor T9 resets, the voltage at node N8 and therefore the voltage on photodiode D1, is pulled back down to circuit ground GND. As light energy enters photodiode D1 the voltage at node N8 begins to rise, thereby starting another integration period.

The image cell 100, however, does not change state instantaneously. Transistors T2 and T3 form a gain stage and delay line which amplify the reset detection action of transistor T10 and also provide a delay long enough to ensure a complete reset of photodiode D1 by reset transistor T9. This can be seen in FIG. 5 between times $t_2$ and $t_d$.

It is also advantageous to store the number of times the image cell 100 has been reset. This reset information is particularly valuable since the total photocurrent that has entered the image cell 100 is a function of the number of times the image cell 100 has been reset plus the voltage level within a current integration period. As shown in FIG. 3, transistor T6 and capacitor C1 comprise memory circuit 103. This memory circuit 103 keeps track of the number of times the image cell 100 has been reset by storing a unit of charge on capacitor C1 every time a reset is executed. Therefore, the voltage on capacitor C1, represents the number of times the reset transistor T9 has been triggered on. For example, in one embodiment of the present invention, each time the reset transistor T9 is triggered on, the voltage at capacitor C1 increases by 5 millivolts (mV). This voltage increment allows information corresponding to about one thousand (1000) resets, or ten (10) bits of information to be stored and read out. These 10 bits of information represent high order bits.

FIGS. 4D and 4E illustrate the voltage at nodes N7 and N8, respectively, with respect to time. As shown in both FIGS., the first integration period begins at time $t_5$ and ends at time $t_6$, the second integration period begins at time $t_6$ and ends at time $t_7$, the third integration period begins at time $t_7$ and ends at time $t_8$, and the fourth integration period begins at time $t_8$.

As shown in FIG. 4D, the voltage at node N7 steps up 5 mV each time the image cell 100 is reset. Therefore, if the voltage at node N7 is measured at time $t_x$, the 15 mV reading indicates the image cell 100 has been reset three times, corresponding to the high order bit information. The voltage representing these high order bits is read out in the conventional way from capacitor C1. The gate of row-select transistor T15 is pulsed with a row-select voltage $V_{RS}$ at time $t_x$. The row-select voltage $V_{RS}$ turns on row-select transistor T15 which causes the voltage on the source of buffer transistor T14, which is the voltage at node N7 less one threshold voltage drop, to appear on the source of row-select transistor T15. This voltage is detected by conventional detection circuitry and then stored as a high order bit information.

On the other hand, as shown in FIG. 4E, the voltage at node N8 ramps up toward VDD1 and then drops down to zero (0) volts when the image cell 100 is reset. When the voltage at node N8 is measured at time $t_x$, the approximate 2.7 mV reading corresponds to the low order bit information. This voltage representing these low order bits is read out from node N8. The gate of row-select transistor T16 is pulsed with a row-select voltage $V_{RS}$ at time $t_2$. The row-select voltage $V_{RS}$ turns on row-select transistor T16 which causes the voltage on the source of buffer transistor T13, which is the voltage at node N8, to appear on the source of row-select transistor T16. The voltage on the source of row-select transistor T16 is detected by conventional detection circuitry and then stored as a low order bit. Therefore, referring again to FIG. 4E, when the low order bits are read out from photodiode D1 at time $t_x$, the corresponding voltage level during the integration period, is approximately 2.7 V. Therefore, the total voltage output of the image cell 100 at time $t_x$ is equal to 2.7 V plus the voltage corresponding to the 15 mV reading, indicating the image cell 100 has been reset three times.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. An apparatus including an image cell circuit for improving dynamic range in an image cell, said image cell circuit comprising:

a circuit node configured to receive a circuit signal;
a reset circuit, coupled to said circuit node and configured to couple to and reset an image cell;
a comparator circuit coupled to said circuit node and configured to compare said circuit signal with a reference value; and
a memory circuit coupled to said comparator circuit; wherein:
when at said circuit signal has a value which transcends said reference value said comparator circuit outputs a reset signal;
said reset circuit receives said reset signal and in accordance therewith resets said image cell; and
said memory circuit receives said reset signal and in accordance therewith stores a reset value indicating said image cell has been reset.

2. The apparatus of claim 1, further comprising a photodiode coupled to said circuit node, wherein said photodiode is configured to generate said circuit signal.

3. The apparatus of claim 1, wherein:
said reset circuit resets said image cell a plurality of times to obtain a corresponding plurality of reset values; and
said memory circuit stores said plurality of reset values.

4. The apparatus of claim 3, further comprising a combining circuit configured to receive and combine said plurality of reset values stored by said memory circuit and a signal value at said circuit node to generate an image signal corresponding to said circuit signal.

5. An apparatus including an image cell circuit for improving dynamic range in an image cell, said image cell circuit comprising:

a circuit node configured to receive a first signal having a plurality of signal values including a first reset value after an image cell has been reset;
a reset circuit, coupled to said circuit node and configured to couple to and reset said image cell;
a comparator circuit coupled to said circuit node and configured to compare said first signal with a reference value; and
a memory circuit coupled to said comparator circuit; wherein:
when said first signal has a value which transcends said reference value said comparator circuit outputs a reset signal;
said reset circuit receives said reset signal and in accordance therewith resets said image cell, said reset circuit resetting said image cell a plurality of times to obtain a corresponding plurality of second reset values; and
said memory circuit stores said plurality of second reset values.

6. The apparatus of claim 5, wherein said plurality of second reset values corresponds to one or more digital bits.

7. The apparatus of claim 5, wherein said first reset value corresponds to a digital bit.

8. The apparatus of claim 5, further comprising a photodetector coupled to said circuit node and configured to generate said first signal.

9. The apparatus of claim 5, wherein said plurality of second reset values corresponds to one or more higher order bits and said first reset value corresponds to a lower order bit.

10. The apparatus of claim 9 further comprising a combining circuit, wherein said combining circuit sums said higher order bits and said lower order bits to generate a digital signal which corresponds to said first signal.

11. The apparatus of claim 5, wherein said potential at said circuit node comprises a first voltage level and said reference potential comprises a second voltage level.

12. A method for increasing the dynamic range of an imaging system having an image cell, the method comprising the steps of:

resetting an image cell a first time;

storing a reset value after said image cell has been reset said first time, indicating said image cell has been reset;

resetting said image cell a second time; and storing a second reset value indicating said image cell has been reset said second time, wherein a sum of said first and said second reset values corresponds to a number of times said image cell has been reset.

13. The method of claim 12, wherein said step of resetting said image cell said first time comprises the steps of:

determining when a voltage potential of said image cell transcends a reference potential; and resetting said image cell when said voltage potential of said image cell transcends said reference potential.

14. The method of claim 12, further comprising the steps of:

reading said image cell after said second time said image cell has been reset to obtain a third reset value;

reading said image cell after said second time said image cell has been reset to obtain said sum of said first and second reset values; and summing said sum of said first and second reset values and said third reset value to generate a circuit signal corresponding to an image stimulus received by said image cell.

15. A method for increasing the dynamic range of an imaging system having an image cell, the method comprising the steps of:

(a) receiving a circuit signal by an image cell;

(b) determining when a voltage potential of said image cell transcends a reference potential;

(c) resetting said image cell when said voltage potential of said image cell transcends said reference potential;

(d) storing a reset value indicating said image cell has been reset; and (e) repeating steps (b) through (d) a plurality of times to obtain a plurality of reset values, wherein said plurality of reset values corresponds to said plurality of times said image cell has been reset.

16. The method of claim 15, further comprising the steps of:

(f) summing said plurality of reset values to obtain a first sum;

(g) reading said image cell to obtain said first sum;

(h) reading said image cell to obtain a third reset value; and (i) summing said first sum and said third reset value to generate a circuit signal corresponding to an image stimulus received by said image cell.

17. A method for increasing the dynamic range of an imaging system having an image cell, the method comprising the steps of:

(a) receiving a circuit signal by an image cell;

(b) determining when a voltage potential of said image cell transcends a reference potential;

(c) resetting said image cell for a first time when said voltage potential of said image cell transcends said reference potential;

(d) storing a first reset value indicating said image cell has been reset;

(e) determining when said voltage potential of said image cell again transcends said reference potential;

(f) resetting said image cell for a second time when said voltage potential of said image cell again transcends said reference potential;

(g) storing a second reset value indicating said image cell has been reset again;

(h) reading said image cell after said image cell has been reset again to obtain a third reset value;

(i) reading said image cell after said image cell has been reset again to obtain a sum of said first and second reset values; and (j) summing said sum of said first and second reset values and said third reset value to generate a signal corresponding to an image stimulus received by said image cell.

18. The method of claim 17, wherein said step (b) comprises the sub-steps of:

(b1) comparing with a comparator circuit said voltage potential of said image cell with said reference potential;

(b2) outputting a reset signal with said comparator circuit when said voltage potential transcends said reference potential; and (b3) receiving said reset signal and in accordance therewith resetting said image cell.

19. The method of claim 18, wherein said step (d) comprises the sub-step of:

(d1) receiving said reset signal with a memory circuit and in accordance therewith storing said first reset value.

20. The method of claim 17, wherein said step (h) comprises the sub-step of reading said image cell after said image cell has been reset again and in accordance therewith generating to lower order bit, and said step (i) comprises the sub-step of reading said image cell after said image cell has been reset again and in accordance therewith generating a higher order bit.

* * * * *